United States Patent
Nishikawa et al.

(10) Patent No.: US 9,573,768 B2
(45) Date of Patent: Feb. 21, 2017

(54) ARTICLE HANDLING FACILITY

(71) Applicant: Daifuku Co., Ltd., Osaka-shi (JP)

(72) Inventors: Tadashi Nishikawa, Shiga (JP); Ryou Yamashita, Shiga (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/162,940

(22) Filed: May 24, 2016

(65) Prior Publication Data

US 2016/0347551 A1    Dec. 1, 2016

(30) Foreign Application Priority Data

May 28, 2015    (JP) ................................. 2015-109089

(51) Int. Cl.
  *G06F 7/00*      (2006.01)
  *G06F 19/00*    (2011.01)
  *B65G 37/02*    (2006.01)

(52) U.S. Cl.
  CPC ....... *B65G 37/02* (2013.01); *B65G 2201/0297* (2013.01); *B65G 2203/0266* (2013.01)

(58) Field of Classification Search
  None
  See application file for complete search history.

(56) References Cited

U.S. PATENT DOCUMENTS

| | | | | |
|---|---|---|---|---|
| 5,319,353 A | * | 6/1994 | Ohnishi | .................. H05K 13/08 |
| | | | | 209/571 |
| 2002/0004921 A1 | * | 1/2002 | Muranaka | ........... G06F 11/1008 |
| | | | | 714/704 |
| 2012/0240017 A1 | * | 9/2012 | Uchida | ............... H04L 49/1515 |
| | | | | 714/821 |
| 2014/0201571 A1 | * | 7/2014 | Hosek | ................. G06F 11/2257 |
| | | | | 714/26 |
| 2016/0042809 A1 | * | 2/2016 | Kim | ....................... G11C 29/42 |
| | | | | 714/719 |

FOREIGN PATENT DOCUMENTS

JP        2001325994 A     11/2001

* cited by examiner

*Primary Examiner* — Yolanda Cumbess
(74) *Attorney, Agent, or Firm* — The Webb Law Firm

(57) ABSTRACT

When a controller determines based on state information that the article handling device is in a normal condition, the controller is configured to transmit to the managing device as the notifying information, normal condition notifying information which includes normal condition determination information which indicates that the article handling device is in a normal condition or normal condition notifying information which includes the normal condition determination information and normal-time information generated based on the state information. When the controller determines that the article handling device is in an abnormal condition based on the state information, the controller is configured to transmit to the managing device abnormal condition notifying information which includes abnormal condition determination information which indicates that the article handling device is in an abnormal condition and abnormal-time information which is generated based on the state information and which has at least one of a greater amount of data and a greater number of data items than the normal-time information.

10 Claims, 5 Drawing Sheets

ARTICLE HANDLING FACILITY

CROSS-REFERENCE TO RELATED APPLICATION

This application claims priority to Japanese Patent Application No. 2015-109089 filed May 28, 2015, the disclosure of which is hereby incorporated in its entirety by reference.

FIELD OF THE INVENTION

The present invention relates to an article handling facility comprising an article handling device for transporting or storing an article, and a controller for controlling operation of the article handling device.

BACKGROUND

JP Publication of Application No. 2001-325994 discloses a use of a managing device to monitor whether an article handling device is working normally. In such an article handling facility, by detecting any abnormal condition that has occurred in the article handling device, it is possible to take necessary measures, such as causing the managing device to command the article handling device to perform an operation in response to the abnormal condition, in order for the facility that includes such article handling device to return to the normal operations.

In order to keep track of the state of article handling devices at any time with a managing device, notifying information is transmitted from article handling devices to the managing device and is accumulated therein. Notifying information may, for example, be detailed information related to the operations of the article handing devices, and may, for example, be information generated based on state information, obtained at set time intervals, related to the state of the article handling devices. And the managing device determines whether an abnormal condition has occurred in an article handing device by analyzing the accumulated notifying information. By using the accumulated notifying information, the managing device can learn (i.e., be informed) not only the fact that the abnormal condition occurred in the article handing device but also the state of the article handling device at the time of the occurrence of the abnormal condition. Therefore, the managing device can learn of the nature of the abnormality by analyzing the circumstances under which the abnormal condition occurred in the article handing device. On the other hand, when the managing device analyzes the accumulated notifying information to detect presence of an abnormal condition and to learn of the nature of the abnormality, there may be a time lag between the time of the actual occurrence of the abnormal condition in an article handing device and the time at which the managing device learns of the nature of the abnormality.

In addition, since it is not possible to predict when an abnormal condition may occur in an article handing device, the article handling device must continue to send notifying information to the managing device while in operation. Therefore, there tends to be a large volume of communication traffic between an article handling device and the managing device, which may lead to congestion in the communication lines. Such condition becomes more prominent in a facility having a number of article handling devices. If the time intervals at which the notifying information is transmitted from the article handling devices to the managing device are made longer to reduce the frequency of communication, although this would reduce the communication traffic, the time lag before the managing device learns of the occurrence, and of the nature of, the abnormality would become even longer.

SUMMARY OF THE INVENTION

Thus, an article handling facility is desired in which a managing device can learn of the nature of an abnormality in an article handling device as quickly as possible while reducing increase in the communication traffic between the article handling device and the managing device.

In one embodiment, an article handling facility comprises an article handling device for transporting or storing an article, and a controller for controlling operation of the article handling device. The controller is configured to collect state information which is information related to operating state of the article handling device, and to transmit notifying information based on the state information to a managing device which manages operation of the article handling device, wherein the controller is configured to: determine whether the article handling device is in a normal condition or in an abnormal condition, based on the state information; and when the controller determines that the article handling device is in a normal condition, to transmit to the managing device as the notifying information, normal condition notifying information which includes normal condition determination information which indicates that the article handling device is in a normal condition or normal condition notifying information which includes the normal condition determination information and normal-time information generated based on the state information; and when the controller determines that the article handling device is in an abnormal condition, to transmit to the managing device as the notifying information, abnormal condition notifying information which includes abnormal condition determination information which indicates that the article handling device is in an abnormal condition and abnormal-time information which is generated based on the state information and which has at least one of a greater amount of data and a greater number of data items than the normal-time information.

With such arrangements, when it is determined that the article handling device is in a normal condition, the managing device can learn that the article handling device is in a normal condition based on the normal condition determination information included in the normal condition notifying information. And when it is determined that the article handling device is in an abnormal condition, the managing device can learn that the article handling device is in an abnormal condition based on the abnormal condition determination information included in the abnormal condition notifying information.

In addition, when it is determined that the article handling device is in an abnormal condition, the abnormal-time information which is detailed information related to the operation of the article handling device is also transmitted to the managing device, in addition to the abnormal condition determination information. The managing device can learn of the nature of the abnormal condition that occurred, for example, by analyzing changes in the state of the article handling device with the passage of time, based on this abnormal-time information. In addition, because not only the abnormal-time information but also the abnormal condition determination information is transmitted to the managing device, it can be determined quickly that an article handling device is in an abnormal condition, compared to the case where the determination of whether the article handling device is in an abnormal condition is made based only on the abnormal-time information.

On the other hand, when it is determined that the article handling device is in a normal condition, the normal condition notifying information, whose total amount of data is less than the abnormal condition notifying information, is transmitted to the managing device. Since the normal condition notifying information is either information that includes only the normal condition determination information, or information that includes the normal-time information which is smaller in size than the abnormal-time information and the normal condition determination information, total amount of data for the normal condition notifying information is less than the abnormal condition notifying information. Therefore, the managing device can accurately learn that the article handling device is in a normal condition while reducing increase in the communication traffic.

As such, the arrangements described above can provide an article handling facility in which the managing device can learn of the nature of abnormality in an article handling device as quickly as possible while reducing increase in the communication traffic between the article handling device and the managing device.

Additional features and advantages of an article handling device will become clear from the following description about the embodiments of the invention with reference to the drawings.

DETAILED DESCRIPTION OF EMBODIMENTS OF THE INVENTION

First Embodiment

Embodiments in which an article handling facility of the present invention is applied to a semiconductor processing facility are described next with reference to the drawings. For the purposes of the following description and claims, unless specifically stated otherwise, the terms "article handling facility" and "article handling device" refer to a facility and a device respectively for performing one or more tasks or functions on, or related to, one or more articles which may be any objects such as containers as in the present embodiments or such as objects being manufactured and/or processed such as semiconductor substrates, where examples of the tasks or functions include transporting, storing, and processing. In addition, each of a managing device and various controllers may include a microcomputer or an arithmetic logic unit, memory, communication unit, etc., and any necessary algorithms for performing required tasks and functions in the form of software stored in the memory.

Figure 1:
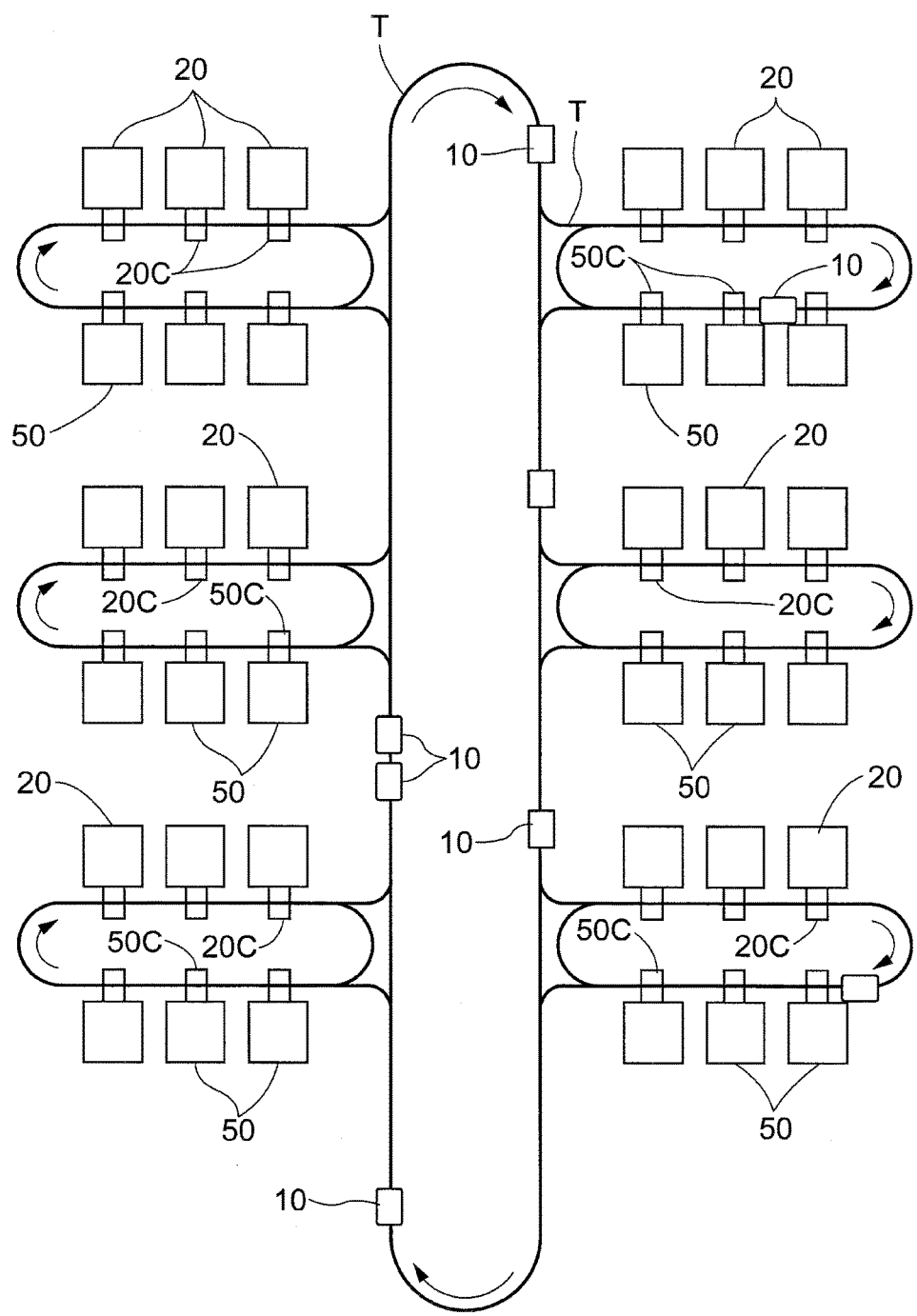
FIG. 1 is a plan view of a semiconductor processing facility.
Figure 2:
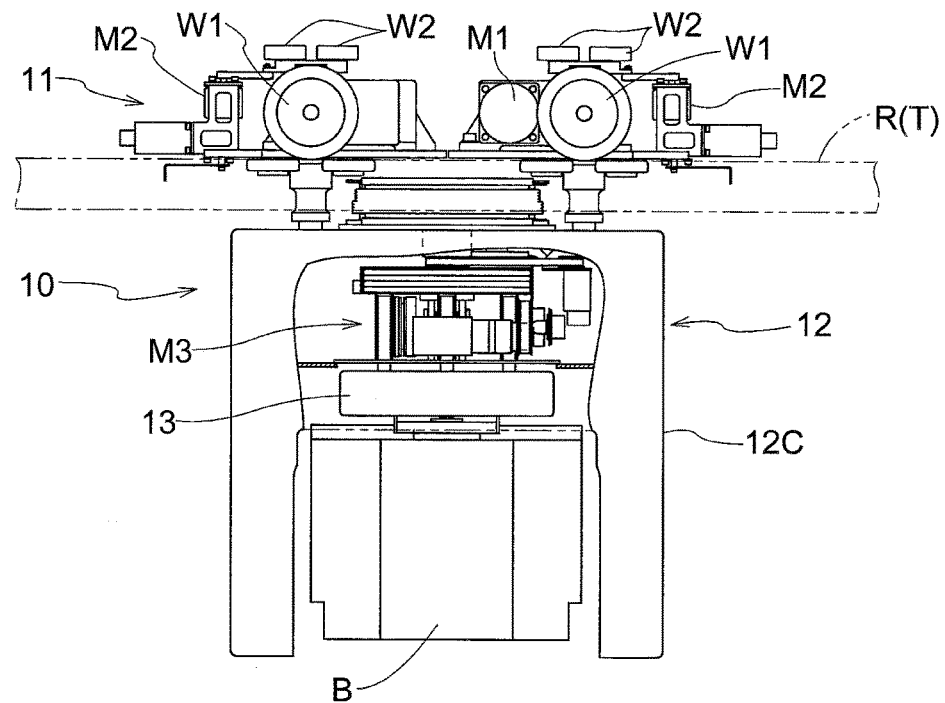
FIG. 2 is a partial cutout side view of a ceiling or overhead transport vehicle.

As shown in FIG. 1, the semiconductor processing facility of the present embodiment includes a plurality of container storage devices 20 for storing containers B, such as FOUPs, etc., for holding a plurality of semiconductor substrates (see FIG. 2), a plurality of semiconductor processing devices 50 each of which is for performing one or more processes such as photo lithography, cleaning, inspections, etc., on the semiconductor substrates taken out from the container B, and ceiling or overhead transport vehicles 10 for transporting the containers B between the container storage devices 20 and the semiconductor processing devices 50. As shown in FIG. 2, each ceiling transport vehicle 10 is configured to travel or move along a pair of travel rails T suspended from and supported by the ceiling C of the semiconductor substrates processing/manufacturing factory.

As shown in FIG. 2, the ceiling transport vehicle 10 includes a travel portion 11 including travel wheels W1 for traveling on the travel rails T, and a main body portion 12 suspended and supported by the travel portion 11. The travel portion 11 further includes steering guide wheels W2 for changing the traveling direction of the travel portion 11 in a branching portion of the travel rails T. The steering guide wheels W2 are configured to come into contact with one of the pair of side faces of a guide rail (not shown) provided along the travel rails T. The traveling direction of the travel portion 11 can be changed by changing the side face to be contacted by the steering guide wheels W2 in a branching portion in which the travel rails T branch off or split into two or more paths. In addition, the travel portion 11 includes a travel actuator M1 for drivingly rotating the travel wheels W1, and a steering actuator M2 for changing the position of the steering guide wheels W2.

The main body portion 12 includes a cover portion 12C suspended from the travel portion 11, and a vertically movable portion 13 which is vertically moved by the vertical movement actuator M3 which is supported by the cover portion 12C. While not shown, the vertically movable portion 13 includes grip portions which can be switched between a gripping state in which the grip portions engage a flange provided in the upper end of a container B and a gripping release state. The travel actuator M1, the steering actuator M2, and the vertical movement actuator M3 are configured to operate with electric power.

In the present embodiment, the ceiling transport vehicle 10 is, or corresponds to, the travel member for transporting articles one article at a time. That is, the article handling device is the ceiling transport vehicle 10 for transporting articles in the present embodiment. And each ceiling transport vehicle 10 is configured to be capable of supporting an article and to move or travel along a travel path (travel rails T). In addition, the electric power for operating the travel actuator M1, the steering actuator M2, and the vertical movement actuator M3 is supplied from electricity supply lines (not shown) which are supported by, and installed along, the travel rails T.

Figure 3:
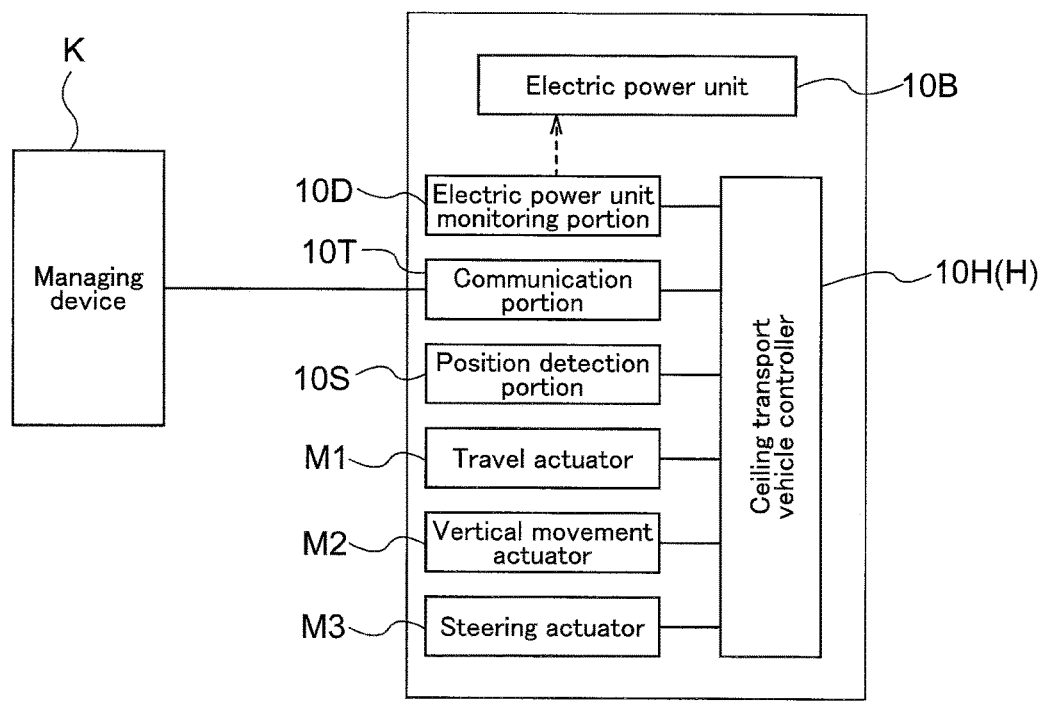
FIG. 3 is a control block diagram of the ceiling transport vehicle.

Control related arrangement for the ceiling transport vehicle 10 is described next with reference to FIG. 3. The ceiling transport vehicle 10 includes an electric power unit 10B for supplying proper electric power to each part that requires electric power for operation, in addition to the travel actuator M1, the steering actuator M2, and the vertical movement actuator M3 described above. The electric power unit 10B outputs electric power of proper voltage and/or current for each part to which electric power is supplied by making such adjustments as adjusting of the voltage of the electric power supplied from the electricity supply lines by increasing or decreasing its voltage, and adjusting of the current of the electric power supplied from the electricity supply lines.

In addition, the ceiling transport vehicle 10 includes a position detection portion 10S for detecting the position of the ceiling transport vehicle 10 along the travel rails T. The position detection portion 10S includes, for example, a rotary encoder for detecting the amount of rotation of a travel wheel W1, and a reading portion for reading position reference marks provided at certain intervals along the travel rails T. The position detection portion 10S detects the position of the ceiling transport vehicle 10 along the travel rails T based on the read-in position of a position reference mark, and the travel amount of the travel portion 11 detected or measured by the rotary encoder. In addition, the position detection portion 10S outputs the detected position to a ceiling transport vehicle controller 10H.

The ceiling transport vehicle controller 10H is connected to the travel actuator M1, the steering actuator M2, and the vertical movement actuator M3 for mutual communication and controls operations of the travel actuator M1, the steering actuator M2, and the vertical movement actuator M3 by issuing operation commands to them individually. In addition, the ceiling transport vehicle controller 10H monitors the operating states of the travel actuator M1, the steering actuator M2, and the vertical movement actuator M3, and obtains information related to the operating states at time intervals for collecting actuator information (or actuator information collecting time intervals; for example, 10 milliseconds, etc.). The ceiling transport vehicle controller 10H can learn of (i.e., be informed of) the operating states of the travel actuator M1, the steering actuator M2, and the vertical movement actuator M3 based on this information.

In addition, the ceiling transport vehicle 10 includes an electric power unit monitoring portion 10D which monitors the state of the electric power unit 10B. The electric power unit monitoring portion 10D is configured to detect each of the current outputted by the electric power unit 10B, the voltage outputted by the electric power unit 10B, and the temperature of the electric power unit 10B at the time intervals for collecting electric power information (or, electric power information collecting time intervals: for example, 1 millisecond), and to store and accumulate the measured values in its memory. For example, 1000 milliseconds' worth of measured values (i.e., measured values from 1000 measurements) of each of the current, the voltage, and the temperature are stored and accumulated in the memory. In addition, the memory is a ring or circular buffer in which the oldest measurement data is deleted first as new measurement data is being stored, in order to store the data for the 1000 latest measurements at all times. In the present embodiment, the one second's worth of measured values is time period state information.

The ceiling transport vehicle controller 10H issues a summary information transmission request to the electric power unit monitoring portion 10D at a 1 second cycle (i.e., one request each second). In response to the summary information transmission request, the electric power unit monitoring portion 10D calculates the maximum value, the minimum value, and the average value of the 1000 measured values for each of the accumulated current, voltage, and temperature values as shown in Table 1 below, and transmits them to the ceiling transport vehicle controller 10H.

TABLE 1

| Summary information | |
|---|---|
| Current | Maximum Value |
|  | Minimum Value |
|  | Average Value |
| Voltage | Maximum Value |
|  | Minimum Value |
|  | Average Value |
| Temperature | Maximum Value |
|  | Minimum Value |
|  | Average Value |

In addition, the semiconductor processing facility includes a managing device K which manages the operation or operating state of each device in the facility in an integrating manner. The managing device K manages the transport schedule of the containers B by the ceiling transport vehicles 10, and issues commands to each ceiling transport vehicle 10 for transporting of a container B. The ceiling transport vehicle 10 includes a communication portion 10T which transmits information to and receives information from this managing device K. The communication portion 10T is configured to be capable of wirelessly exchanging data with a wireless base station provided in the semiconductor processing facility. In addition, the wireless base station is connected to the managing device K through an intra-facility communications network, such as a LAN.

In the present embodiment, the ceiling transport vehicle 10 is, or corresponds to, the article handling device whereas the ceiling transport vehicle controller 10H and the electric power unit monitoring portion 10D are, or correspond to, the controller. In addition, information about the current, the voltage, and the temperature (referred to hereinafter as measured raw data) detected by the electric power unit monitoring portion 10D is, or corresponds to, the state information. The maximum value and the minimum value of the measured values, and the average value of 1000 measured value are, or correspond to, the summary information. That is, a ceiling transport vehicle 10 for transporting articles one article at a time, and a ceiling transport vehicle controller 10H for controlling the operation of the ceiling transport vehicle 10 are provided. And the electric power unit monitoring portion 10D is configured to collect state information which is information related to the operating state of the ceiling transport vehicle 10.

The ceiling transport vehicle controller 10H is configured to transmit notifying information which is based on the measured values of the current, the voltage, and the temperature, to the managing device K which manages the operating states of the ceiling transport vehicles 10. In such a semiconductor processing facility, when an abnormal condition occurs in the electric power unit 10B of a ceiling transport vehicle 10, the ceiling transport vehicle 10 stop operating, or comes to be in the state in which it is not preferable to continue its operation. In response, the managing device K takes such an action as, among other possibilities, excluding the ceiling transport vehicle 10 in which the abnormal condition occurred from the vehicles 10 to which transport commands are issued. In the present embodiment, when an abnormal condition occurs in a ceiling transport vehicle 10, the ceiling transport vehicle controller 10H transmits to the managing device K normal condition notifying information or abnormal condition notifying information based on the state information of the ceiling transport vehicle 10, in order to notify the managing device K of the abnormal condition.

Figure 4:
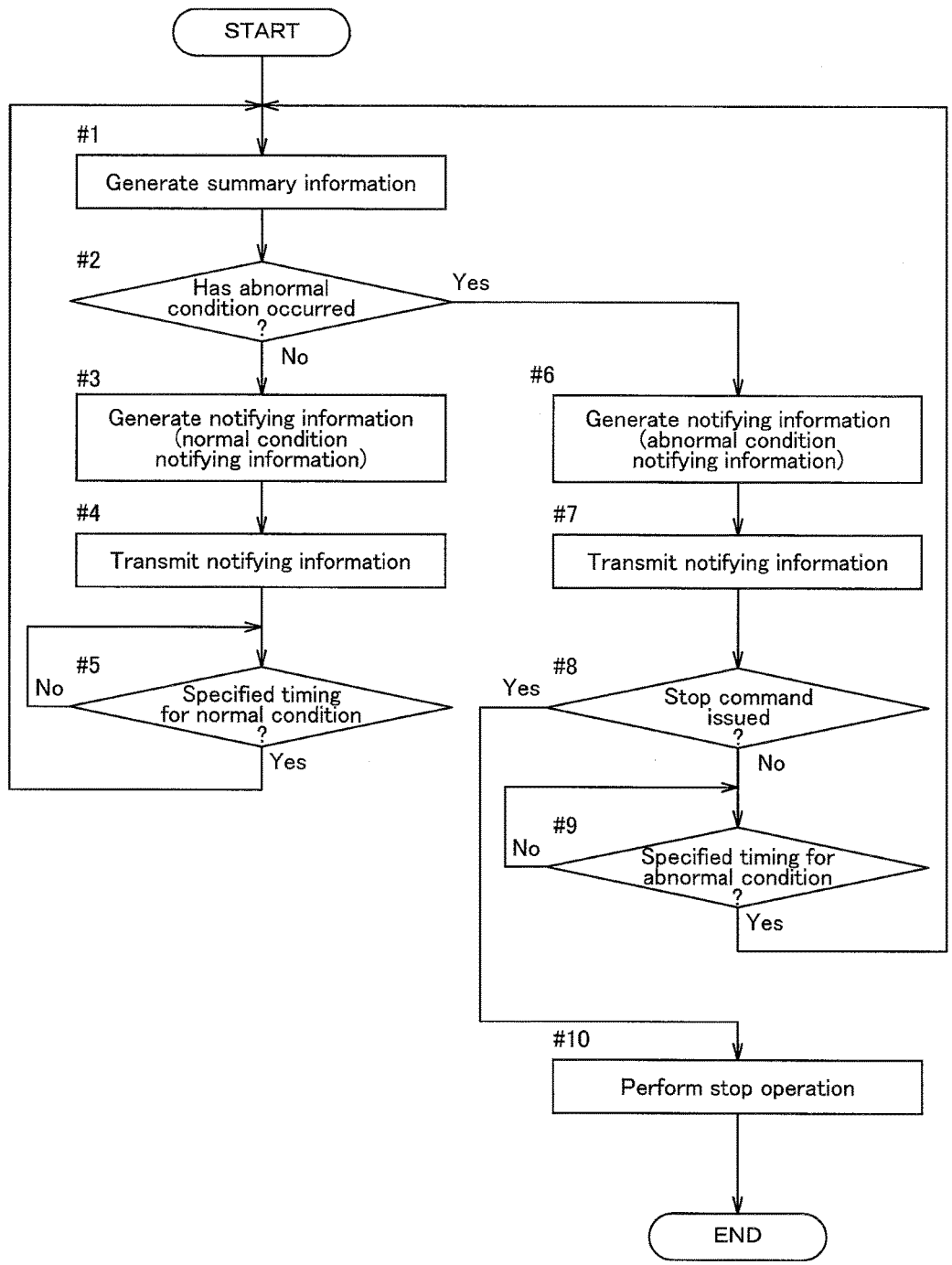
FIG. 4 is a flowchart of a control performed by a controller.

The control performed by the ceiling transport vehicle controller 10H is described next with reference to the flowchart of FIG. 4. The ceiling transport vehicle controller 10H performs a summary information generating operation in which summary information is generated based on the measured values of the current, the voltage, and the temperature collected by the electric power unit monitoring portion 10D (#1). The ceiling transport vehicle controller 10H stores a tolerance range for determining an abnormal condition, for each of the current, the voltage, and the temperature. And the ceiling transport vehicle controller 10H determines that the electric power unit 10B is in an abnormal condition when at least one of the following is true: (a) the maximum value or the minimum value of the current is outside the tolerance range for the current, (b) the maximum value or the minimum value of the voltage is outside the tolerance range for the voltage, and (c) the maximum value or the minimum value of the temperature is outside the tolerance range for the temperature (#2). That is, the ceiling transport vehicle controller 10H is configured to determine that an abnormal condition exists if and when at least one of the output voltage, the output current, and the temperature, of the electric power unit 10B is or falls outside the corresponding tolerance range for determining an abnormal condition.

When it is determined in step #2 that an abnormal condition has not occurred (#2: No), the ceiling transport vehicle controller 10H generates a "normal condition flag" which is 1 byte long and which indicates that the ceiling transport vehicle 10 is operating normally or in a normal condition. And the ceiling transport vehicle controller 10H: generates normal condition notifying information by putting together into one bundle the normal condition flag, the summary information, and measured raw data for 10 measurements sampled at 100 millisecond intervals (i.e. one sample taken every 100 milliseconds) among the measured raw data measured by the electric power unit monitoring portion 10D (#3); and transmits the normal condition notifying information to the managing device K (#4). The ceiling transport vehicle controller 10H returns to the operation of Step #1 after one second which is set as a specified time interval for normal condition, from the start of Step #1. So the ceiling transport vehicle controller 10H returns to the operation of Step #1, at the specified timing for normal condition (#5). In the present embodiment, the specified time interval for normal condition is, or corresponds to, the first specified time interval.

In addition, when it is determined in step #2 that an abnormal condition has occurred (#2; Yes), the ceiling transport vehicle controller 10H generates an "abnormal condition flag" which is 1 byte long and which indicates that the ceiling transport vehicle 10 is in an abnormal condition. And the ceiling transport vehicle controller 10H: generates abnormal condition notifying information by putting together into one bundle the abnormal condition flag, the summary information, position information of the ceiling transport vehicle 10 measured by the position detection portion 10S, information on whether the grip portion is holding an article, and measured raw data for, e.g., 500 measurements (0.5 seconds' worth of data) among one second's worth of the measured raw data measured by the electric power unit monitoring portion 10D (#6); and transmits the abnormal condition notifying information to the managing device K (#7). In other words, the ceiling transport vehicle controller 10H is configured to transmit to the managing device (as abnormal-time information) the position information which indicates the position of the ceiling transport vehicle 10 when the state information which is used as a basis for generating the abnormal-time information was collected, as well as information that indicates whether the ceiling transport vehicle 10 was supporting an article.

Subsequently, the ceiling transport vehicle controller 10H determines if the managing device K has issued a stop command for performing a stop operation for stopping the supplying of electric power to the ceiling transport vehicle 10 (#8), and performs the stop operation if it is determined that a stop command has been issued (#8: Yes) (#10). Here, the stop operation is an operation in which a relay of the electric power unit 10B of the ceiling transport vehicle 10 is switched by the managing device K to stop the supplying of electric power to the ceiling transport vehicle 10. In addition, if it is determined that a stop command has not been issued (#8: No), the ceiling transport vehicle controller 10H returns to the operation of step #1 after, for example, 0.5 seconds which is set as a specified time interval for abnormal condition, from the start of Step #1. So the ceiling transport vehicle controller 10H returns to the operation of Step #1, at the specified timing for abnormal condition (#9). In the present embodiment, the specified time interval for abnormal condition is, or corresponds to, the second specified time interval.

In the present embodiment, the normal condition flag is, or corresponds to, normal condition determination information, and an abnormal condition flag is, or corresponds to, abnormal condition determination information. In addition, the normal-time information includes (alternatively, consists of, or alternatively consists only of) summary information and measured raw data for 10 measurements, whereas the abnormal-time information includes (alternatively, consists of, or alternatively consists only of) the position information of the ceiling transport vehicle 10 measured or detected by the position detection portion 10S, information on whether the grip portion is holding an article, and measured raw data for 500 measurements made by the electric power unit monitoring portion 10D. Thus, the ceiling transport vehicle controller 10H is configured to: determine whether the ceiling transport vehicle 10 is in a normal condition or in an abnormal condition based on the state information; and when it determines that the ceiling transport vehicle 10 is in a normal condition, transmit to the managing device K (as notifying information) the normal condition notifying information which includes (alternatively, consists of, or alternatively consists only of) normal time information generated based on the state information, and the normal condition flag which indicates that the ceiling transport vehicle 10 is in a normal condition; and when it determines that the ceiling transport vehicle 10 is in an abnormal condition, transmits to the managing device K (as notifying information) the abnormal condition determination information which indicates that the ceiling transport vehicle 10 is in an abnormal condition, and the abnormal condition notifying information generated based on the state information.

The respective sizes of data for the normal condition notifying information and the abnormal condition notifying information are such that the data size for the abnormal condition notifying information is greater than the data size for the normal condition notifying information, as shown in the table 2 below. Note that each data size in the following table 2 is not limited to the size shown in the table as an example, and may be changed depending on the kind of the required data and on how the data is expressed in the managing device (i.e. expressed by a single precision type real number or double precision type real number, etc.).

TABLE 2

| | Normal condition notifying information | Data size | Abnormal condition notifying information | Data size |
|---|---|---|---|---|
| Determination flags | Normal condition flag | 1 byte | Abnormal condition flag | 1 byte |
| Current | Max. value | 3 bytes | Max. value | 3 bytes |
| | Min. value | 3 bytes | Min. value | 3 bytes |
| | Ave. value | 3 bytes | Ave. value | 3 bytes |
| Voltage | Max value | 3 bytes | Max. value | 3 bytes |
| | Min. value | 3 bytes | Min. value | 3 bytes |
| | Ave. value | 3 bytes | Ave. value | 3 bytes |
| Temperature | Max. value | 3 bytes | Max. value | 3 bytes |
| | Min. value | 3 bytes | Min. value | 3 bytes |
| | Ave. value | 3 bytes | Ave. value | 3 bytes |
| Position information | N/A | — | Present | 50 bytes |
| Article holding state information | N/A | — | Present | 1 byte |
| Measured raw data | 100 milliseconds intervals (10 measurements) | 90 bytes | 1 millisecond intervals (500 measurements) | 4500 bytes |
| Total | | 118 bytes | | 4579 bytes |

In addition, in the present embodiment, the measured raw data that the electric power unit monitoring portion 10D collects in 1 second, is, or correspond to, time period state information. In other words, the abnormal-time information has a greater amount of data and a greater number of data items than the normal time information. And the ceiling transport vehicle controller 10H is configured to perform, repeatedly at each set time interval, the summary information generating operation for generating summary information, which has less amount of data than the time period state information, based on the time period state information which is the state information collected in a set period of time (i.e. time period in which the specified time interval for normal condition elapses), and is configured to transmit the normal condition determination information and the summary information to the managing device K as normal condition notifying information, and is configured to transmit the abnormal condition determination information and the time period state information to the managing device K as abnormal condition notifying information. In addition, the ceiling transport vehicle controller 10H is configured to transmit the normal condition notifying information repeatedly to the managing device K at each first specified time interval (1 second) as long as, or for the duration of the time that, the ceiling transport vehicle controller 10H is determining that the ceiling transport vehicle 10 is in a normal condition, and is configured to transmit the abnormal condition notifying information repeatedly to the managing device K at each second specified time interval (0.5 seconds) which is shorter than the first specified time interval (1 second) as long as, or for the duration of the time that, the ceiling transport vehicle controller 10H is determining that the ceiling transport vehicle 10 is in an abnormal condition.

Second Embodiment

The second embodiment of the present invention is described next. In the first embodiment above, a case where a ceiling transport vehicle 10 is the article handling device was described. In the second embodiment, a case where a container storage device 20 is the article handling device is described. The second embodiment is different from the first embodiment only in that the article handling device is a container storage device 20; accordingly, only the aspects of the second embodiment that are different from those of the first embodiment are described below while omitting description of aspects that are common to both embodiments. As in the case of the first embodiment, each ceiling transport vehicle 10 is configured to travel along a pair of travel rails T suspended from and supported by the ceiling C of the semiconductor substrates processing factory as shown in FIGS. 2 and 5.

Figure 5:
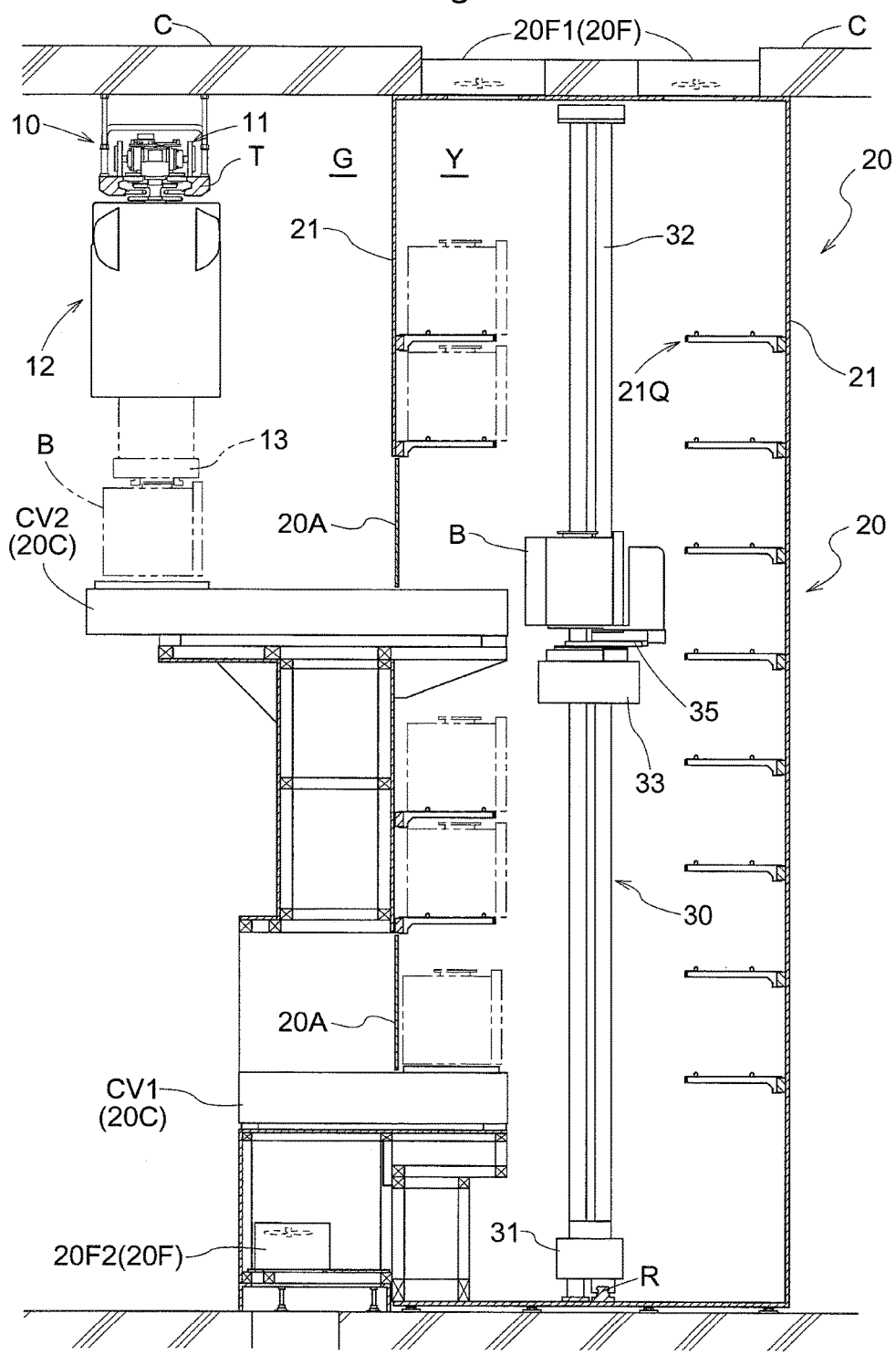
FIG. 5 is a sectional elevational side view of a container storage device.

As shown in FIG. 5, the container storage device 20 includes, within internal space Y surrounded by walls 21 each of which extends along a vertical direction, a plurality of support portions 21Q each of which can support a container B and which are arranged in a lateral direction and along the vertical direction, and a stacker crane 30 which is located on the front-face side of the support portions 21Q along a direction along which a container is brought in and out of a support portion (taking-in-and-out direction) and which has a transfer device 35 that can transfer a container B to and from each support portion 21Q. The stacker crane 30 includes a travel carriage 31 configured to travel on and along a travel rail R installed on the floor surface along the lateral direction, a vertical movement mast 32 provided to stand erect on the travel carriage 31, and a vertically movable member 33 which can be moved vertically along the vertical movement mast 32. The transfer device 35 is supported by the vertically movable member 33. The transfer device 35 can be moved to each of the plurality of support portions 21Q and to a front face area of the end portion, on the side of the internal space Y, of the conveyor 20C described below, to transfer a container B between a support portion 21Q and the transfer device 35, or between the conveyor 20C and the transfer device 35.

Openings are formed in portions of the wall 21. In addition, provided for each opening is an automatic door 20A for opening and closing the opening. In addition, conveyors 20C are provided for transporting containers B between the internal space Y and the exterior space G of the container storage device 20, through respective openings. Note that, in the present embodiment, the conveyors 20C include an upper conveyor V2 for transferring a container B to and from a ceiling transport vehicle 10, and a lower conveyor V1 for transferring a container B transported by a worker. In addition, the container storage device 20 has fan units 20F (upper fan units 20F 1 and a lower fan unit 20F2) for forming downward air flow that moves from the top area toward the bottom area of the internal space Y in order to reduce floating of impurity particles in the internal space Y. Furthermore, an internal temperature sensor 20S for measuring the temperature of the internal space Y is attached to the container storage device 20 (not shown in FIG. 5; see FIG. 6).

Figure 6:
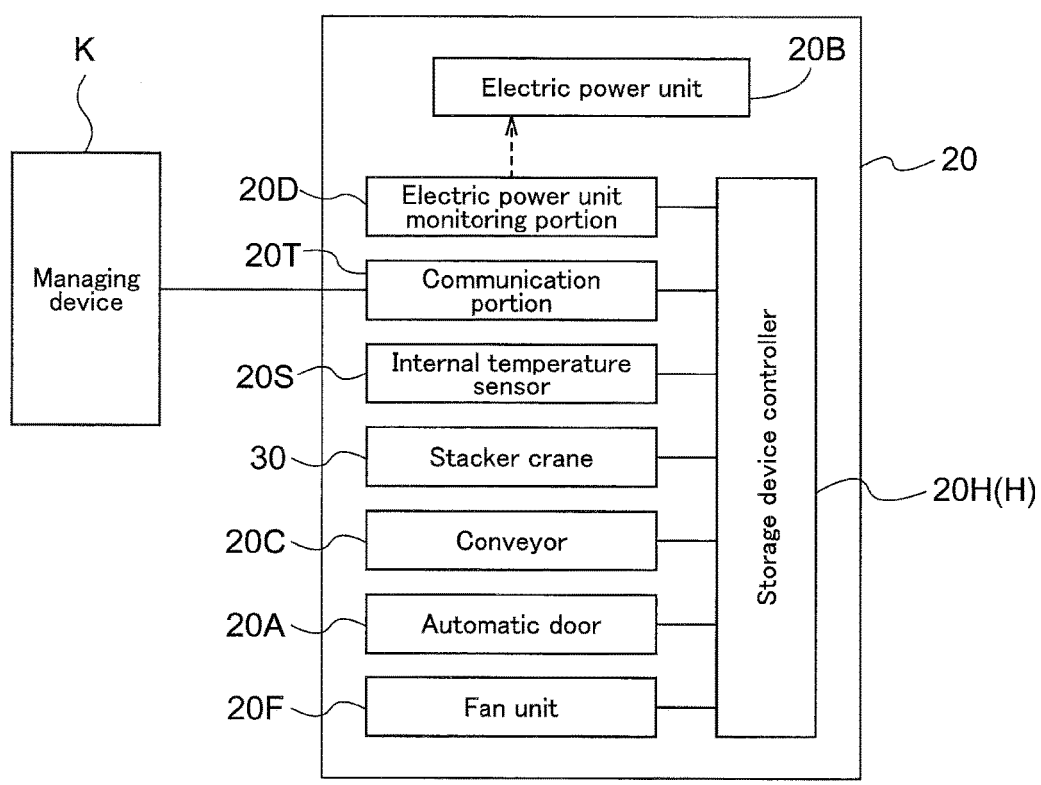
FIG. 6 is a control block diagram for the container storage device.

Control related arrangement of the container storage device 20 is described next with reference to FIG. 6. In the container storage device 20, the stacker crane 30, the conveyors 20C, the automatic doors 20A, the fan units 20F, and internal temperature sensor 20S, among other things, operate with electric power. And the container storage device 20 has an electric power unit 20B for supplying electric power of proper voltage to these components. In addition, this container storage device 20 has an electric power unit monitoring portion 20D which monitors the supply or operating state of the electric power by the electric power unit 20B.

The electric power unit monitoring portion 20D detects the voltage and current outputted by the electric power unit 20B, and the temperature of the electric power unit 20B, and outputs the detected results to a storage device controller 20H in response to an information transmission request from a storage device controller 20H.

The storage device controller 20H is connected to the stacker crane 30, the conveyors 20C, the automatic doors 20A, the fan units 20F, and the internal temperature sensor 20S, for mutual communication. The storage device controller 2011 controls operations of the stacker crane 30, the conveyors 20C, the automatic doors 20A, and the fan units 20F by outputting operation commands to them individually. In addition, the storage device controller 20H monitors the operating states of the stacker crane 30, the conveyors 20C, the automatic doors 20A, and the fan units 20F, and obtains information related to the operating states at the time intervals for collecting actuator information (or actuator information collecting time intervals: for example, 10 milliseconds, etc.). The storage device controller 20H can learn of (i.e., be informed of) the operating states of the stacker crane 30, the conveyors 20C, the automatic doors 20A, and the fan units 20F based on this information.

In addition, the container storage device 20 includes a communication portion 20T which transmits information to and receive information from the managing device K. The managing device K manages the carrying in and out schedule of the containers B with respect to the container storage device 20, and issues a command to the container storage device 20 to cause a container B to be carried into or out of the container storage device 20. The communication portion 20T is configured to be capable of wirelessly exchanging data with the managing device K through an intra-facility communications network, such as a LAN. In the present embodiment in which the container storage device 20 is the article handling device, the storage device controller 20H and the electric power unit monitoring portion 20D are, or correspond to, the controller. In addition, the information on the current, the voltage, and the temperature (referred to hereinafter as measured raw data) detected by the electric power unit monitoring portion 20D is, or corresponds to, the state information whereas the maximum value and the minimum value of the measured values, and the average value of 1000 measured values are, or correspond to, the summary information.

The storage device controller 20H is configured to transmit the notifying information based on the measured values of the current, the voltage, and the temperature to the managing device K which manages or keeps track of the operating state of the container storage device 20. In such a semiconductor processing facility, when an abnormal condition occurs in the electric power unit 20B of the container storage device 20, the container storage device 20 stops operating, or comes to be in the state in which it is not preferable to continue its operation. In response, the managing device K takes such an action as, among other possibilities, excluding the container storage device 20 in which the abnormal condition occured from the container storage devices 20 to which the containers B are to be transported and carried in. In the present embodiment, when an abnormal condition occurs in a container storage device 20, the storage device controller 20H transmits to the managing device K normal condition notifying information or abnormal condition notifying information based on the state information of the container storage device 20, in order to notify the managing device K of the abnormal condition. Detailed description of the control performed by the storage device controller 20H is omitted since the control is identical to what was described above with reference to the flowchart of FIG. 4 in the first embodiment.

Alternative Embodiments (1) In the first and the second embodiments described above, an example embodiment is described in which the normal condition notifying information is transmitted to the managing device K at each first specified time interval of 1 second, and the abnormal condition notifying information is transmitted to the managing device K at each second specified time interval of 0.5 seconds. However, the time intervals for the transmission of the normal condition notifying information and the time intervals for the transmission of the abnormal condition notifying information are not limited to these time intervals. The any desired time intervals for the transmission may be selected so long as the time intervals for the transmission of the normal condition notifying information are greater than the time intervals for the transmission of the abnormal condition notifying information. In addition, the time intervals for the transmission of the normal condition notifying information may be identical to the time intervals for the transmission of the abnormal condition notifying information. In this case, the normal condition notifying information may include only the information that indicates that the device is operating normally whereas the abnormal condition notifying information may include, in addition to the information that indicates that the device is operating abnormally, various kinds of information that indicates the state of the device at the time of the occurrence of the abnormal condition. With such an arrangement, the amount of traffic of the information transmitted to the managing device K can be reduced to the extent possible when the article handling device is operating normally; and, necessary information can be transmitted to the managing device K when an abnormal condition occurs in the article handling device.

(2) In the first and the second embodiments described above, an example is described in which the normal condition flag (normal condition determination information) and the normal time information (summary information) are transmitted to the managing device K, as the normal condition notifying information. However, the invention is not limited to such arrangement and only the normal condition flag (normal condition determination information) may be transmitted to the managing device K as the normal condition notifying information.

(3) As an article handling device that transports or stores articles, a ceiling transport vehicle 10 is used as an example in the first embodiment described above while a container storage device 20 is used as an example in the second embodiment. However, an article handling device is not limited to a ceiling transport vehicle 10 or a container storage device 20. The article handling device may be, for example, a fixed transport device, such as a roller conveyor, or a semiconductor processing device, such as a photo lithography device, cleaning device, and an inspection device. Furthermore, in the embodiments described above, a device that handles an article (container B) in a semiconductor processing facility is used as an example of an article handling device. However, an article handling device may be applied to any facility other than a semiconductor processing facility so long as the facility is such that the operation of the article handling device is controlled by a managing device.

(4) In the first and the second embodiments described above, an example is described in which the state information is operating state information related to the electric power unit 10B or 20B and outputted by the electric power unit monitoring portion 10D or 20D. However, the state information may, in addition, or alternatively, include information other than the operating state information related to the electric power unit 10B or 20B. For example, for the ceiling transport vehicle 10, the state information may include information that indicates the operating state of a negative brake provided to the travel actuator M1, the switching position of the steering actuator M2, and/or the operating state of a negative brake provided to the vertical movement actuator M3. In addition, for the container storage device 20, the state information may include information that indicates the operating state of the transfer device of the stacker crane 30 and/or open/closed states of the automatic doors 20A.

(5) In the first and the second embodiments described above, an example is described in which the time interval for collecting electric power information is set to be 1 millisecond. However, the time interval for collecting electric power information does not have to be 1 millisecond but may be longer or shorter than 1 millisecond. In addition, an example was described in which measured values of the current, the voltage, and the temperature for 1000 measurements for each is stored and accumulated in memory. However, the number of the measured values accumulated in memory may be changed as desired. In addition, in the first and the second embodiments, the oldest measured values accumulated in memory are deleted one by one from the memory as new measured values are being stored. However, arrangements may be made to save the older measured values in a hard disk etc., provided to the article handling device.

(6) In the first and the second embodiments described above, an example is described in which the first specified time interval is set to be 1 second, and the second specified time interval is set to be 0.5 seconds. However, the first specified time interval and the second specified time interval are not limited to such time intervals. In addition, in the first and the second embodiments described above, an example is described in which the summary information is generated based on measured values for 1000 measurements (i.e. measured values taken in 1 second), and in which the normal condition notifying information is generated every second (which is set as the first specified time interval), and is transmitted to the managing device K. However, the invention is not limited to such arrangements. Instead, the summary information may be generated based on measured values from measurements taken in a time period shorter than 1 second. And the normal condition notifying information that includes more than one piece of summary information may be transmitted to the managing device K at each first specified time interval.

(7) In the first and the second embodiments described above, the maximum value, the minimum value, and the average value for each of the current, the voltage, and the temperature are calculated for the summary information. However, the invention is not limited to such an arrangement. And various changes and modifications may be made for the summary information. For example, the possibility includes an arrangement in which the average values are not calculated, or an arrangement in which a medium value is calculated instead of the average value.

Summary of the Embodiments

The article handing facility described above is briefly summarized next.

In one embodiment, an article handing facility comprises an article handing device for transporting or storing an article, and a controller for controlling operation of the article handling device. The controller is configured to collect state information which is information related to operating state of the article handling device, and to transmit notifying information based on the state information to a managing device which manages operation of the article handling device, wherein the controller is configured to: determine whether the article handling device is in a normal condition or in an abnormal condition, based on the state information; and when the controller determines that the article handling device is in a normal condition, to transmit to the managing device as the notifying information, normal condition notifying information which includes normal condition determination information which indicates that the article handling device is in a normal condition or normal condition notifying information which includes the normal condition determination information and normal-time information generated based on the state information; and when the controller determines that the article handling device is in an abnormal condition, to transmit to the managing device as the notifying information, abnormal condition notifying information which includes abnormal condition determination information which indicates that the article handling device is in an abnormal condition and abnormal-time information which is generated based on the state information and which has at least one of a greater amount of data and a greater number of data items than the normal-time information.

With such arrangements, when it is determined that the article handling device is in a normal condition, the managing device can learn that the article handling device is in a normal condition based on the normal condition determination information included in the normal condition notifying information. And when it is determined that the article handling device is in an abnormal condition, the managing device can learn that the article handling device is in an abnormal condition based on the abnormal condition determination information included in the abnormal condition notifying information.

In addition, when it is determined that the article handling device is in an abnormal condition, the abnormal-time information which is detailed information related to the operation of the article handling device is also transmitted to the managing device, in addition to the abnormal condition determination information. The managing device can learn of the nature of the abnormal condition that occurred, for example, by analyzing changes in the state of the article handling device with the passage of time, based on this abnormal-time information. In addition, because not only the abnormal-time information but also the abnormal condition determination information is transmitted to the managing device, it can be determined quickly that an article handling device is in an abnormal condition, compared to the case where the determination of whether the article handling device is in an abnormal condition is made based only on the abnormal-time information.

On the other hand, when it is determined that the article handling device is in a normal condition, the normal condition notifying information, whose total amount of data is less than the abnormal condition notifying information, is transmitted to the managing device. Since the normal condition notifying information is either information that includes only the normal condition determination information, or information that includes the normal-time information which is smaller in size than the abnormal-time information and the normal condition determination information, total amount of data for the normal condition notifying information is less than the abnormal condition notifying information. Therefore, the managing device can accurately learn that the article handling device is in a normal condition while reducing increase in the communication traffic.

As such, the arrangements described above can provide an article handling facility in which the managing device can learn of the nature of abnormality in an article handling device as quickly as possible while reducing increase in the communication traffic between the article handling device and the managing device.

In addition, in one embodiment of the article handling facility, the controller is preferably configured to: perform, repeatedly at each set time interval, a summary information generating operation for generating summary information based on time period state information which is the state information that is collected in a set time period which has a same length as the set time interval, the summary information having at least one of a less amount of data and a less number of data items than time period state information; transmit the normal condition determination information and the summary information to the managing device as the normal condition notifying information; and transmit the abnormal-time information and the time period state information to the managing device as the abnormal condition notifying information.

With the arrangement described above, the abnormal condition notifying information is information that includes the abnormal condition determination information and the time period state information whereas the normal condition notifying information is information that includes the normal condition determination information and the summary information. Since the summary information has at least one of a less amount of data and a less number of data items than the time period state information, the total amount of data of the normal condition notifying information is less than that of the abnormal condition notifying information. Thus, an article handing facility can be provided in which the managing device can learn of (i.e. be informed of) the nature of abnormality in an article handling device as quickly as possible while reducing increase in the communication traffic between the article handing device and the managing device. Here, the time period state information preferably contains sufficient amount of information to allow the managing device to analyze the circumstances under which the abnormal condition occurred, and to learn of the state of the article handing device at the time the abnormal condition occurred. When an abnormal condition occurs in the article handling device, the managing device can accurately learn of the abnormal condition of the article handling device, etc., based on the abnormal condition notifying information transmitted from the controller. In addition, since no such analysis is necessary for the summary information, it would be sufficient for the summary information to contain just enough information that would allow the managing device to learn that the article handling device is in a normal condition. Therefore, when the article handling device is in a normal condition, the managing device can properly learn that the article handling device is in a normal condition, based on summary information while reducing increase in the communication traffic between the article handling device and the managing device.

In addition, in one embodiment of the article handling facility, the controller is preferably configured to: transmit normal condition notifying information to the managing device repeatedly at each first specified time interval for a duration of time that the controller determines that the article handling device is in a normal condition, and transmit abnormal condition notifying information to the managing device repeatedly at each second specified time interval which is shorter than the first specified time interval, for a duration of time that the controller determines that the article handling device is in an abnormal condition.

With such arrangements, the notifying information is transmitted more frequently when the article handling device is in an abnormal condition (second specified time interval) than when the article handling device is in a normal condition (first specified time interval). Thus, when the article handling device is in an abnormal condition, the managing device can learn of the nature of the abnormal condition in more detail in a given amount of time than when the article handling device is in a normal condition.

Here, the state information is preferably information related to one or more of output voltage of the electric power unit provided to the article handling device, output current of the electric power unit, and temperature of the electric power unit, wherein the controller is preferably configured to determine that the abnormal condition exists if at least one of the output voltage, the output current, and the temperature falls outside a corresponding tolerance range for determining an abnormal condition.

When an abnormal condition occurs in an electric power unit of an article handling device, it is not preferable, in many cases, to allow the operation of the article handling device to continue. Output voltage of the electric power unit, output current of the electric power unit, and temperature of the electric power unit, etc. are conceivable as state information for indicating the state of an electric power unit. With the arrangement described above, any abnormal condition that occurred in the electric power unit can be properly detected by determining that an abnormal condition occurred when at least one of the output voltage, the output current, and the temperature falls outside a corresponding tolerance range for determining an abnormal condition.

In one embodiment, the article handling device is preferably a travel member for transporting an article. And when the travel member is preferably capable of supporting an article and is configured to move along a travel path, the controller preferably transmits to the managing device as the abnormal-time information, position information which indicates a position of the travel member when the state information used as a basis for generating the abnormal-time information was collected.

When an abnormal condition occurs in the travel member as the article handling device, there is a possibility that the travel member may stop along the travel path. Because the position information which indicates the position of the travel member is included in the abnormal-time information, the managing device can learn of the position along the travel path at which the travel member has stopped.

In one embodiment, the article handling device is preferably a travel member for transporting an article. And when the travel member is preferably capable of supporting an article and is configured to move along a travel path, the controller preferably transmits to the managing device as the abnormal-time information, information that indicates whether the travel member was supporting an article when the state information used as a basis for generating the abnormal-time information was collected.

When an abnormal condition occurs in the travel member as the article handling device, there is a possibility that the travel member may stop with an article supported by the travel member. Because information which indicates whether the travel member was supporting an article is included in the abnormal-time information, the managing device can learn whether the travel member is supporting an article. This, for example, allows a worker to take a responsive action, such as, removing the article from the travel member, which can reduce lowering of the yield or productivity due to the inability to ship out, or perform processes on, the article caused by the inability to transport the article.

What is claimed is:

1. An article handling facility comprising:
an article handling device for transporting or storing an article; and
a controller for controlling operation of the article handling device;
wherein the controller is configured to collect state information which is information related to operating state of the article handling device, and to transmit notifying information based on the state information to a managing device which manages operation of the article handling device,
wherein the controller is configured to:
determine whether the article handling device is in a normal condition or in an abnormal condition, based on the state information; and
when the controller determines that the article handling device is in a normal condition, transmit to the managing device as the notifying information, normal condition notifying information which includes normal condition determination information which indicates that the article handling device is in a normal condition or normal condition notifying information which includes the normal condition determination information and normal-time information generated based on the state information; and
when the controller determines that the article handling device is in an abnormal condition, transmit to the managing device as the notifying information, abnormal condition notifying information which includes abnormal condition determination information which indicates that the article handling device is in an abnormal condition and abnormal-time information which is generated based on the state information and which has at least one of: a greater amount of data and a greater number of data items than the normal-time information.

2. The article handling facility as defined in claim 1, wherein the controller is configured to:
perform, repeatedly at each set time interval, a summary information generating operation for generating summary information based on time period state information which is the state information that is collected in a set time period which has a same length as the set time interval, the summary information having at least one of a less amount of data and a less number of data items than time period state information;
transmit the normal condition determination information and the summary information to the managing device as the normal condition notifying information; and
transmit the abnormal-time information and the time period state information to the managing device as the abnormal condition notifying information.

3. The article handling facility as defined in claim 1, wherein the controller is configured to:
transmit normal condition notifying information to the managing device repeatedly at each first specified time interval for a duration of time that the controller determines that the article handling device is in a normal condition, and
transmit abnormal condition notifying information to the managing device repeatedly at each second specified time interval which is shorter than the first specified time interval, for a duration of time that the controller determines that the article handling device is in an abnormal condition.

4. The article handling facility as defined in claim 1, wherein the state information is information related to one or more of output voltage of the electric power unit provided to the article handling device, output current of the electric power unit, and temperature of the electric power unit, and
wherein the controller is configured to determine that the abnormal condition exists if at least one of: the output voltage, the output current, and the temperature falls outside a corresponding tolerance range for determining an abnormal condition.

5. The article handling facility as defined in claim 1, wherein the article handling device is a travel member for transporting an article,
wherein the travel member is capable of supporting an article and is configured to move along a travel path, and
wherein the controller transmits to the managing device as the abnormal-time information, position information which indicates a position of the travel member when the state information used as a basis for generating the abnormal-time information was collected.

6. The article handling facility as defined in claim 1, wherein the article handling device is a travel member for transporting an article,
wherein the travel member is capable of supporting an article and is configured to move along a travel path, and
wherein the controller transmits to the managing device as the abnormal-time information, information that indicates whether the travel member was supporting an article when the state information used as a basis for generating the abnormal-time information was collected.

7. The article handling facility as defined in claim 2, wherein the controller is configured to:
transmit normal condition notifying information to the managing device repeatedly at each first specified time interval for a duration of time that the controller determines that the article handling device is in a normal condition, and
transmit abnormal condition notifying information to the managing device repeatedly at each second specified time interval which is shorter than the first specified time interval, for a duration of time that the controller determines that the article handling device is in an abnormal condition.

8. The article handling facility as defined in claim 7, wherein the state information is information related to one or more of output voltage of the electric power unit provided to the article handling device, output current of the electric power unit, and temperature of the electric power unit, and
wherein the controller is configured to determine that the abnormal condition exists if at least one of the output voltage, the output current, and the temperature falls outside a corresponding tolerance range for determining an abnormal condition.

9. The article handling facility as defined in claim 8, wherein the article handling device is a travel member for transporting an article, wherein the travel member is capable of supporting an article and is configured to move along a travel path, and wherein the controller transmits to the managing device as the abnormal-time information, position information which indicates a position of the travel member when the state information used as a basis for generating the abnormal-time information was collected.

10. The article handling facility as defined in claim 9, wherein the article handling device is a travel member for transporting an article, wherein the travel member is capable of supporting an article and is configured to move along a travel path, and wherein the controller transmits to the managing device as the abnormal-time information, information that indicates whether the travel member was supporting an article when the state information used as a basis for generating the abnormal-time information was collected.

\* \* \* \* \*